March 8, 1932.    E. M. SHANNON    1,848,908
ELECTRIC LOCOMOTIVE TRUCK
Filed Oct. 4, 1930    2 Sheets-Sheet 2
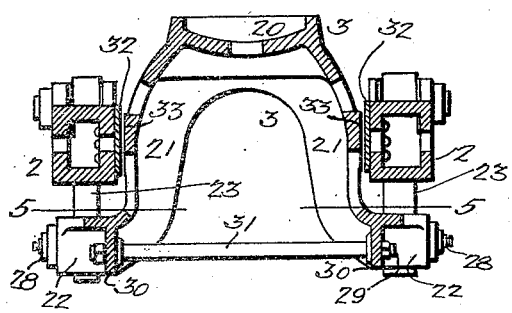
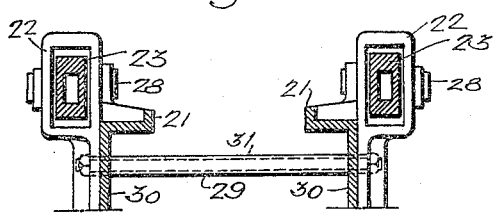
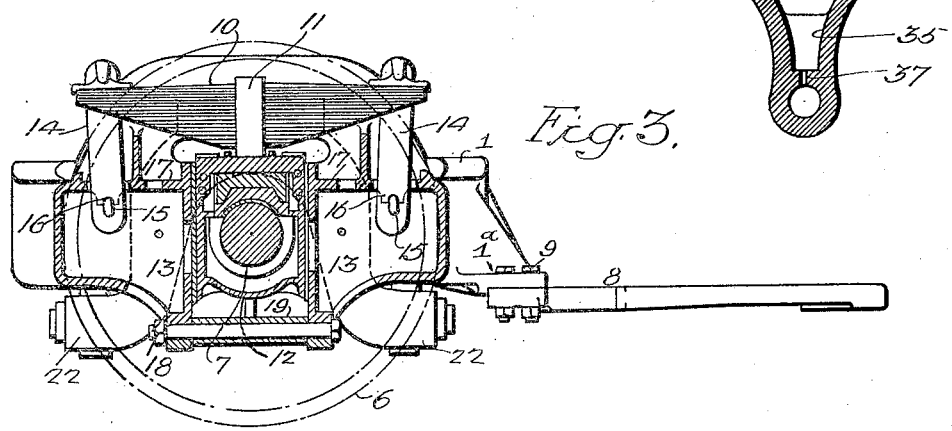
Inventor:-
Ellwood M. Shannon
By his Attorneys
Howson & Howson

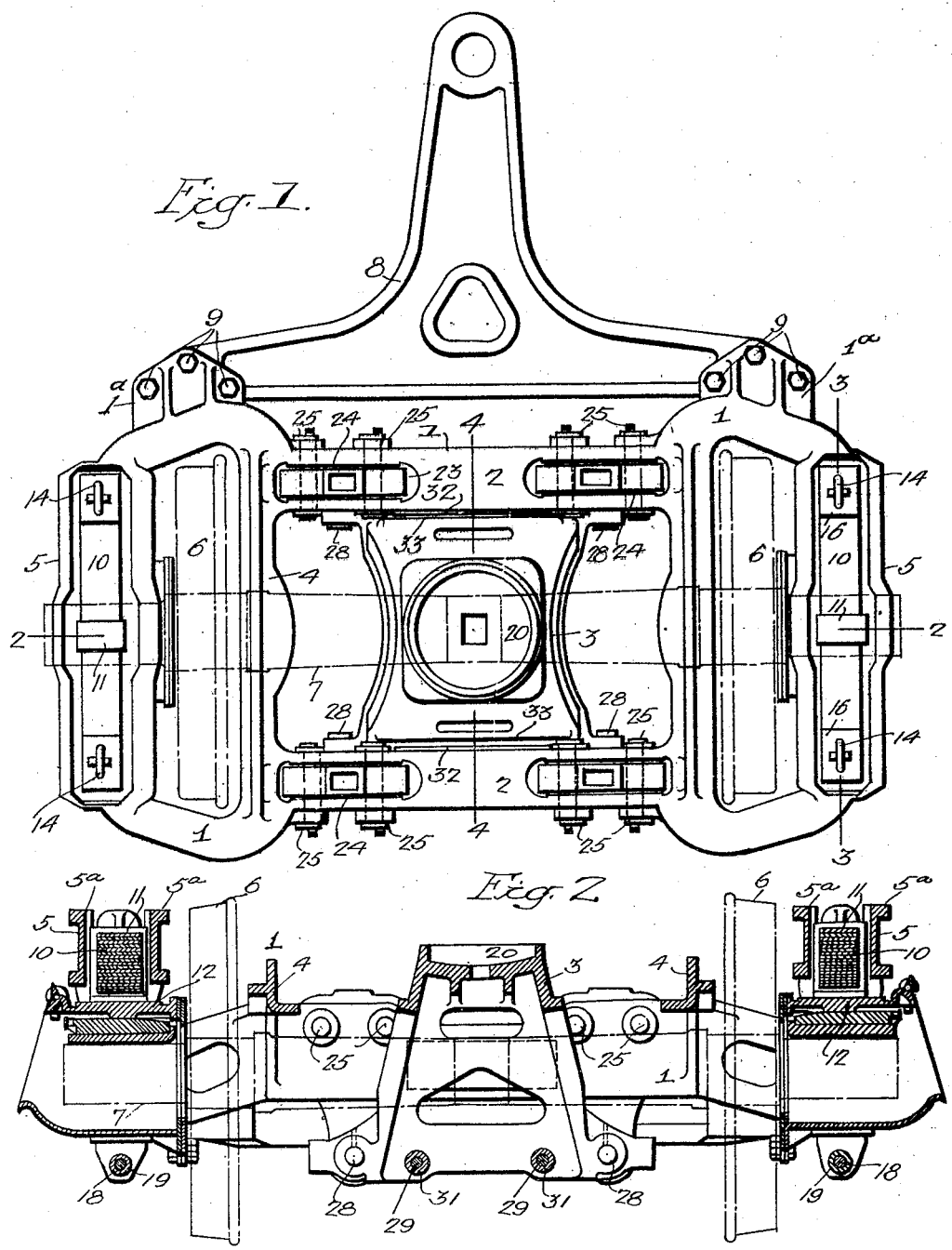

UNITED STATES PATENT OFFICE

ELLWOOD M. SHANNON, OF BALA, PENNSYLVANIA

ELECTRIC LOCOMOTIVE TRUCK

Application filed October 4, 1930. Serial No. 486,446.

My invention relates to certain improvements in swing trucks of the type having two wheels and outside bearings, and which are particularly adapted to electric locomotives, but it will be understood that the truck can be mounted under other rolling stock as well.

One object of the invention is to make the frame of this truck as a substantial integral casting.

Another object of the invention is to mount semi-elliptic springs directly on the axle boxes and locate these springs between two members of the outer portion of the frame of the truck.

A further object of the invention is to so design the bolster that the lower bearing for the swing links will be located directly under the upper bearing for the links, which are carried by the transverse members of the main frame.

The invention also relates to details of construction which will be described hereinafter.

In the accompanying drawings:

Fig. 1 is a plan view;

Fig. 2 is a transverse sectional view on the line 2—2, Fig. 1;

Fig. 3 is a longitudinal sectional view on the line 3—3, Fig. 1;

Fig. 4 is a longitudinal sectional view on the line 4—4, Fig. 1;

Fig. 5 is a sectional plan view of a portion of the bolster on the line 5—5, Fig. 4;

Fig. 6 is a perspective view of one of the links; and

Fig. 7 is a sectional view of one of the links.

Referring to the drawings, 1 is the frame of the truck, made in a single casting and consisting of two transverse members 2—2, spaced apart, and in the space is the bolster 3. The two end sections 4 and 5, at each side of the truck, are spaced apart for the wheels 6, which are mounted on the axles 7, the wheels and axles being shown by dotted lines in Figs. 1 and 2.

At one end of the frame 1 are lugs 1a, to which is attached the radius bar 8, by bolts 9, but in some instances the radius bar may be made integral with the frame 1, if desired. Each end member 5 consists of two sections 5a spaced apart and preferably channel-shaped in cross section, as shown in Fig. 2. Located between the two sections is a semi-elliptical spring 10, the central strap 11 of the spring resting upon the boxes 12, located between pedestals 13, forming integral parts of each end member 5, and the outer ends of each spring are connected to the said end member by links 14, which have keys 15 resting in seats 16 on the underside of the web 17, which forms an integral part of the end member 5. One type of axle box is shown, but it will be understood that any suitable type of box may be used without departing from the essential features of the invention. The pedestals 13 are connected by bolts 18, and they are spaced apart by a sleeve 19, through which the bolt extends.

The bolster 3 is shown in Fig. 4, and has a center bearing 20, and the two end members 21 of the bolster extend downwards through the frame 1, between the front and rear transverse members 2, and the lower ends 22 of these members extend under the transverse members 2 of the frame, and are connected to these members 2 by links 23 of the type shown in Fig. 6. The transverse members 2 are slotted at 24, and two pins 25 extend across the slots. These pins are spaced apart so as to form bearings for the portions 26 of the links 23. In the lower portion of each link 23 is an opening 27 for the pivot pin 28. The pivot pins connect the links to the portions 22 of the bolster. By this construction the upper and the lower pins have bearings on each side of the links, making a substantial structure.

In order to counteract the strain on the members 21 of the bolster, tie bolts 29 extend from one web 30 to the other in the lower portion of the pedestal, and these bolts pass through tubular members 31. By this arrangement the bolster can be made comparatively light, yet will be sufficiently strong.

On each of the transverse members 2 are wear plates 32, which are opposite the wear surfaces 33 of the bolster. Each link is made as shown in Figs. 6 and 7, and has two receptacles 34 and 35 for lubricant. Passages 36 lead from the receptacle 34 to the bearing surface of the links for the pins 25, and the receptacle 35 has a passage 37, which communicates with the bearing for the lower pin 28, thus insuring the lubricating of the bearing surfaces of the links.

I claim:

1. The combination in a two-wheel radial truck, of an axle and wheels two transverse members spaced apart and connected at each end by two side members, said side members being spaced apart for the wheels of the truck; a bolster located in the space between the two transverse members, the lower portions of the bolster extending below the axle and under the transverse members; links suspended from the transverse members and connected to the extended portions of the bolster; and detachable tie bolts extending across the lower portion of the bolster and under the axle and connecting the lower ends of the bolster.

2. The combination in a two-wheel radial truck, of an integral frame consisting of two transverse members spaced apart; two members at each side of the frame, the two side members being spaced apart for the wheels of the truck, the outside side members being bifurcated and having pedestals; boxes mounted in the pedestals; an axle extending into the boxes; a semi-elliptical spring mounted in each outside bifurcated side member of the frame, each spring bearing upon an axle box, the links connecting the outer ends of the springs with the frame; and a bolster hung from said frame.

3. An integral frame for a two-wheel radial truck, consisting of two transverse members spaced apart; inner side members at each side of the truck, connected to said transverse members; and two outside members, one at each side of the truck and connected to the inside members at their ends, said outside members being spaced from the inside members to accommodate the wheels of the truck, each outside member having two longitudinal sections spaced apart for semi-elliptical springs.

4. The combination in a two-wheel radial truck, of an integral frame having two transverse members spaced apart, and connected at their outer ends by two inner side members; an outer side member at each side of the truck, spaced from the inner side members to allow wheels to extend into the spaces between the side members, each outer side member having pedestals; an axle box mounted between each pair of pedestals; a semi-elliptical spring mounted in the outer side member and bearing upon a box; links connecting the ends of the springs with the outer side members; a bolster having a center bearing at its upper end, and downwardly extending members projecting under the transverse members at their lower ends; four pairs of pins on the transverse members of the frame; a rocker link suspended from each pair of said pins; and a pin connecting each link with the projecting lower portions of the bolster.

5. A swing link for a truck, made as an integral structure and having two bearings at the upper end thereof and a single bearing at the lower end thereof; a lubricant receptacle in the upper portion of the link; passages in the link leading from said upper receptacle to the two upper bearings; a lubricant receptacle in the lower portion of the link, above the lower bearing; and a passage forming a communication between the last-mentioned receptacle and the lower bearing.

ELLWOOD M. SHANNON.